United States Patent
Heredia et al.

(10) Patent No.: US 11,149,492 B2
(45) Date of Patent: Oct. 19, 2021

(54) METHODS FOR MANUFACTURING A DRUM AND A SPRING BRAKE FOR AN ELECTROMECHANICAL ACTUATOR, ASSOCIATED ELECTROMECHANICAL ACTUATOR AND HOME AUTOMATION INSTALLATION

(71) Applicant: SOMFY ACTIVITES SA, Cluses (FR)

(72) Inventors: Stéphane Heredia, Divonne les Bains (FR); Florian Bodet, La Roche sur Foron (FR); Eric Lagarde, Sallanches (FR); Antoine Rodriguez, Le Fayet (FR)

(73) Assignee: SOMFY ACTIVITES SA, Cluses (FR)

( * ) Notice: Subject to any disclaimer, the term of this patent is extended or adjusted under 35 U.S.C. 154(b) by 27 days.

(21) Appl. No.: 16/603,608

(22) PCT Filed: Apr. 13, 2018

(86) PCT No.: PCT/EP2018/059489
§ 371 (c)(1),
(2) Date: Oct. 8, 2019

(87) PCT Pub. No.: WO2018/189353
PCT Pub. Date: Oct. 18, 2018

(65) Prior Publication Data
US 2020/0378182 A1    Dec. 3, 2020

(30) Foreign Application Priority Data

Apr. 14, 2017   (FR) ...................................... 1753316

(51) Int. Cl.
*E06B 9/72*      (2006.01)
*B24B 33/02*     (2006.01)
(Continued)

(52) U.S. Cl.
CPC ................ *E06B 9/72* (2013.01); *B24B 33/02* (2013.01); *C25D 3/56* (2013.01); *E06B 9/42* (2013.01);
(Continued)

(58) Field of Classification Search
CPC ................... F16D 49/02; F16D 1/0823; F16H 2025/2463; F16H 25/2454; E06B 9/72;
(Continued)

(56) References Cited

U.S. PATENT DOCUMENTS 3,347,345 A * 10/1967 Rogers .................. F16D 65/833
188/264 E
6,415,894 B2 * 7/2002 Giorgetti ............... F16D 63/004
188/18 R (Continued)

FOREIGN PATENT DOCUMENTS

| CN | 101275456 A | 10/2008 |
|----|-------------|---------|
| CN | 101802434 A | 8/2010 |

(Continued)

OTHER PUBLICATIONS

SP-Series Spring Clutches—Tiny-Clutch, Helander Products, Inc. (https://tinyclutch.com/sp-series-spring-clutches.htm) (Year: 2016).*

(Continued)

*Primary Examiner* — Randell J Krug
(74) *Attorney, Agent, or Firm* — Nixon & Vanderhye (57) ABSTRACT

A method relates to the manufacture of a drum for a spring brake for an electromechanical actuator, the drum including a housing configured to house at least one helical spring, an input member and an output member. The housing has an internal friction surface configured to cooperate with at least one coil of the helical spring. The method includes at least one step of mechanical surface treatment of the inner surface of the housing of the drum, the mechanical surface treatment
(Continued)

of the inner surface of the housing of the drum being a step of creating grooves on the inner surface of the housing.

14 Claims, 4 Drawing Sheets

(51) Int. Cl.
| | |
|---|---|
| *C25D 3/56* | (2006.01) |
| *E06B 9/42* | (2006.01) |
| *C23C 8/30* | (2006.01) |
| *E06B 9/68* | (2006.01) |
| *E06B 9/90* | (2006.01) |
| *F16H 25/24* | (2006.01) |

(52) U.S. Cl.
CPC ........ *C23C 8/30* (2013.01); *E06B 2009/6809* (2013.01); *E06B 2009/725* (2013.01); *E06B 2009/905* (2013.01); *F16H 25/2454* (2013.01)

(58) Field of Classification Search
CPC ....... E06B 2009/6809; E06B 2009/905; E06B 2009/725; E06B 9/42; B24B 33/02; C25D 3/56; C23C 8/30
USPC .......................................... 310/77; 192/223.4
See application file for complete search history.

(56) References Cited

U.S. PATENT DOCUMENTS

| | | | | |
|---|---|---|---|---|
| 7,311,297 B1* | 12/2007 | Bradshaw | ............... | B66D 3/18 |
| | | | | 254/271 |
| 8,253,288 B2* | 8/2012 | Lagarde | ................. | F16D 51/02 |
| | | | | 310/77 |
| 2015/0090542 A1 | 4/2015 | Duits et al. | | |
| 2015/0364969 A1 | 12/2015 | Brondex | | |

FOREIGN PATENT DOCUMENTS

| | | |
|---|---|---|
| CN | 101929303 A | 12/2010 |
| CN | 104662249 A | 5/2015 |
| CN | 105178836 A | 12/2015 |
| DE | 102004035117 A1 | 2/2006 |
| EP | 0278865 A2 | 8/1988 |
| EP | 2957705 A1 | 12/2015 |
| FR | 2610668 A1 | 8/1988 |
| FR | 2995001 A1 | 3/2014 |

OTHER PUBLICATIONS

Wayback Machine (https://tinyclutch.com/sp-series-spring-clutches.htm) (Year: 2016).*
International Search Report, dated Jun. 8, 2018, from corresponding PCT application No. PCT/EP2018/059489.
French Search Report, dated Oct. 12, 2017, from corresponding PCT application No. PCT/EP2018/059489.

* cited by examiner

METHODS FOR MANUFACTURING A DRUM AND A SPRING BRAKE FOR AN ELECTROMECHANICAL ACTUATOR, ASSOCIATED ELECTROMECHANICAL ACTUATOR AND HOME AUTOMATION INSTALLATION

BACKGROUND OF THE INVENTION

Field of the Invention

The present invention relates to a method for manufacturing a drum of a spring brake of an electromechanical actuator, a method for manufacturing a spring brake of an electrochemical actuator comprising such a drum obtained according to the aforementioned manufacturing method, an electromechanical actuator for a home automation installation for closing or providing sun protection comprising such a spring brake obtained according to the aforementioned manufacturing method, and a home automation installation for closing or providing sun protection incorporating such an electromechanical actuator.

Description of the Related Art

In general, the present invention relates to the field of concealing devices comprising a motorized drive device setting a screen in motion between at least one first position and at least one second position.

A motorized drive device comprises an electromechanical actuator for a movable element for closing, concealing or providing solar protection, such as a shutter, door, gate, blind or any other equivalent material, hereinafter referred to as a screen.

Document FR 2,610,668 A1 is already known, and describes an electromechanical actuator for a home automation installation for closing or providing sun protection comprising an electric motor, a reduction gear and a spring brake.

The spring brake comprises a helical spring, a drum, an input member and an output member.

Each end of the helical spring forms a tab extending radially relative to an axis of rotation of the spring brake.

The drum comprises a cylindrical housing. Additionally, an inner friction surface of the housing of the drum is configured to cooperate with at least one turn of the helical spring. In this way, at least one turn of the helical spring is radially stressed by the housing of the drum.

The input member is rotated by the electric motor. The input member is configured to cooperate with one of the tabs of the helical spring, so as to rotate the helical spring around the axis of rotation of the spring brake in a first direction of rotation. Such a movement releases the spring brake. The frictional force between the turns of the helical spring and the inner surface of the housing of the drum is decreased during rotational driving of the helical spring in the first direction of rotation. In other words, this movement tends to decrease the diameter of the outer enclosure of the helical spring and therefore to decrease the radial stress between the helical spring and the inner surface of the housing of the drum.

The output member is configured to cooperate with one of the tabs of the helical spring, so as to rotate the helical spring around the axis of rotation of the spring brake in a second direction of rotation, the second direction of rotation being opposite the first direction of rotation. Such a movement activates the spring brake. The frictional force between the turns of the helical spring and the inner surface of the housing of the drum is increased during the rotational driving of the helical spring in the second direction of rotation. In other words, this movement tends to increase the diameter of the outer enclosure of the helical spring, and therefore to increase the radial stress between the helical spring and the inner surface of the housing of the drum.

However, this electromechanical actuator has the drawback of generating noise, during the operation of the spring brake and, in particular, during a lowering phase of a screen of a concealing device. The appearance of noise is more pronounced when the temperature of the spring brake is high, in particular after the implementation of several operating cycles of the electromechanical actuator.

The operating noise of the spring brake is generated due to a frictional instability resulting from adherence phases and slipping phases of at least one turn of the spring brake relative to the inner surface of the housing of the drum. This frictional instability is generated by the metal-on-metal contact of at least one turn of the spring brake on the inner surface of the housing of the drum.

BRIEF SUMMARY OF THE INVENTION

The present invention aims to resolve the aforementioned drawbacks and to propose a method for manufacturing a drum of a spring brake of an electromechanical actuator, a method for manufacturing a spring brake of an electrochemical actuator comprising such a drum, an electromechanical actuator for a home automation installation for closing or providing sun protection comprising such a spring brake, and a home automation installation for closing or providing sun protection comprising such an electromechanical actuator, making it possible to reduce the operating noise of the spring brake and to limit the frictional instability between at least one turn of the spring brake and an inner frictional surface of a housing of the drum.

In this respect, the present invention targets, according to a first aspect, a method for manufacturing a drum of a spring brake of an electromechanical actuator, the drum comprising a housing, the housing being configured to house at least one helical spring, an input member and an output member, the housing having an inner friction surface configured to cooperate with at least one turn of the helical spring.

According to the invention, the method comprises at least one mechanical surface treatment step for the inner surface of the housing of the drum, the mechanical surface treatment step for the inner surface of the housing of the drum being a step for generating furrows on the inner surface of the housing.

Thus, the inner surface of the housing of the drum includes furrows obtained by a mechanical surface treatment, so as to improve the guiding of a lubricant, optimize the lubrication of the contact zones between the helical spring and the drum and reduce the operating noise of the spring brake.

In this way, the inner surface of the housing of the drum has a specific texturing of the surface with which at least one turn of the helical spring is in contact.

Furthermore, the mechanical surface treatment of the inner surface of the housing of the drum allows a precise determination of the roughness parameters of the inner surface of the housing of the drum, so as to guarantee the maintenance of the lubricant between the helical spring and the inner surface of the housing of the drum.

As a result, the mechanical surface treatment of the inner surface of the housing of the drum makes it possible to guarantee the lubrication between the helical spring and the drum and to control the contact interface between at least one turn of the helical spring and the inner surface of the housing of the drum.

According to one preferred feature of the invention, each furrow arranged at the inner surface of the housing of the drum is oriented by a predetermined angle relative to a rotation axis of the drum.

According to another preferred feature of the invention, the mechanical surface treatment step of the inner surface of the housing consists of generating a first series of furrows and a second series of furrows on the inner surface of the housing. The furrows of the first series are crossed relative to the furrows of the second series. The furrows of the first series are oriented by a first predetermined angle relative to the rotation axis of the drum. Furthermore, the furrows of the second series are oriented by a second predetermined angle relative to the rotation axis of the drum.

According to one advantageous feature of the invention, the first orientation angle and the second orientation angle, respectively, of the furrows of the first series and the furrows of the second series, relative to the rotation axis of the drum, are comprised in a range extending between 45° and 85° and preferably of about 80°.

According to another advantageous feature of the invention, following the mechanical surface treatment step, the method comprises a thermochemical surface treatment step of the drum.

According to another advantageous feature of the invention, following the thermochemical surface treatment step, the method comprises a step for applying a solid lubricant on the inner surface of the housing of the drum.

According to another advantageous feature of the invention, the step for applying solid lubricant is carried out by spraying lubricant in powder form on the inner surface of the housing of the drum.

According to a second aspect, the present invention relates to a method for manufacturing a spring brake of an electromechanical actuator, the spring brake comprising:
 a helical spring,
 a drum obtained according to a method for manufacturing the drum according to the invention, as previously mentioned,
  where the drum includes a housing, and
  where an inner friction surface of the housing of the drum is configured to cooperate with at least one turn of the helical spring,
 an input member, and
 an output member.

According to the invention, the method comprises at least one step for assembling the helical spring, the input member and the output member to the inside of the housing of the drum.

Thus, the method for manufacturing the spring brake is carried out following the manufacture of the drum.

According to a third aspect, the present invention relates to an electromechanical actuator for a home automation installation for closing or providing sun protection comprising an electric motor, a reduction gear, a spring brake obtained according to a method for manufacturing a spring brake according to the invention, as previously mentioned, the spring brake comprising:
 a helical spring,
 a drum,
  where the drum includes a housing, and
  where an inner friction surface of the housing of the drum is configured to cooperate with at least one turn of the helical spring,
 an input member, and
 an output member.

According to the invention, the inner surface of the housing of the drum includes furrows.

This electromechanical actuator has features and advantages similar to those previously described relative to the methods for manufacturing the drum and the spring brake according to the invention, as mentioned above.

According to a fourth aspect, the invention relates to a home automation installation for closing or providing sun protection that comprises a screen able to be wound on a winding tube rotated by an electromechanical actuator according to the invention.

This home automation installation has features and advantages similar to those previously described relative to the electromechanical actuator according to the invention, as described above.

BRIEF DESCRIPTION OF THE DRAWINGS

Other particularities and advantages of the invention will also appear in the description below.

In the appended drawings, provided as non-limiting examples.

DETAILED DESCRIPTION OF THE PREFERRED EMBODIMENTS

Figure 1:
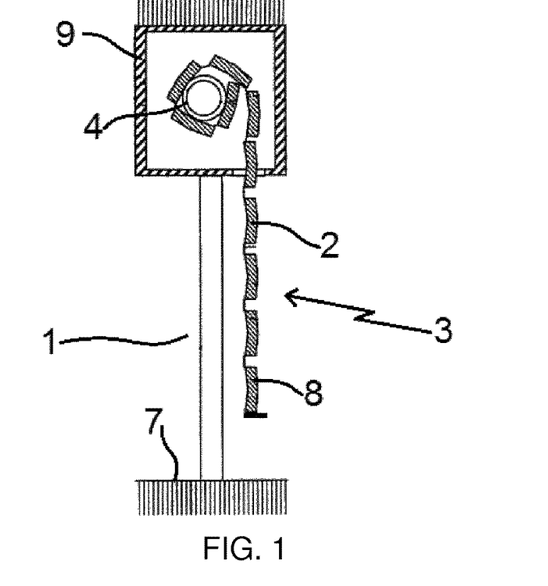
FIG. 1 is a cross-sectional schematic view of a home automation installation according to one embodiment of the invention.
Figure 2:
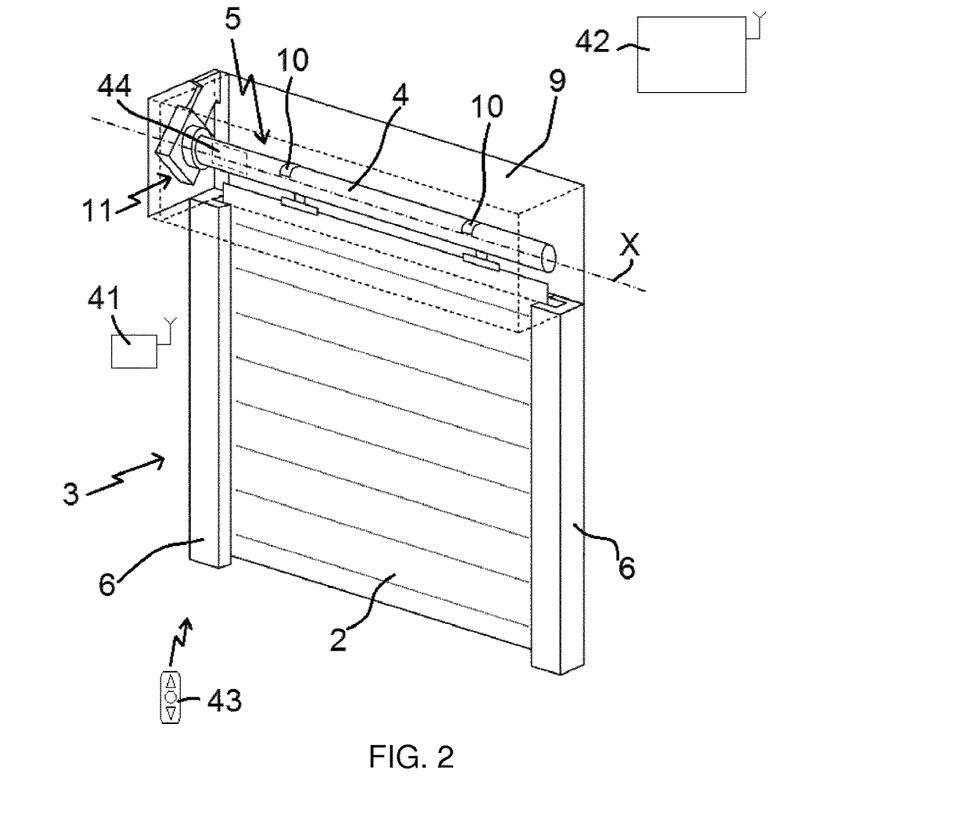
FIG. 2 is a schematic perspective view of the home automation installation illustrated in FIG. 1.

In reference to FIGS. 1 and 2, we first describe a home automation installation according to the invention and installed in a building comprising an opening 1, window or door, equipped with a screen 2 belonging to a concealing device 3, in particular a motorized rolling shutter.

The concealing device 3 can be a rolling shutter, as illustrated in FIGS. 1 and 2, a canvas blind, a blind with adjustable slats, or a rolling gate. The present invention applies to all types of concealing devices.

A rolling shutter according to one embodiment of the invention is described in reference to FIGS. 1 and 2.

The screen 2 of the concealing device 3 is wound on a winding tube 4 driven by a motorized drive device 5 and movable between a wound position, in particular an upper position, and an unwound position, in particular a lower position.

The moving screen 2 of the concealing device 3 is a closing, blackout and/or sun protection screen, winding on the winding tube 4, the inner diameter of which is generally substantially greater than the outer diameter of an electromechanical actuator 11, such that the electromechanical actuator 11 can be inserted into the winding tube 4 during the assembly of the concealing device 3.

The motorized drive device 5 comprises the electromechanical actuator 11, in particular of the tubular type, making it possible to set the winding tube 4 in rotation so as to unwind or wind the screen 2 of the concealing device 3.

The concealing device 3 comprises the winding tube 4 for winding the screen 2. In the mounted state, the electromechanical actuator 11 is inserted into the winding tube 4.

In a known manner, the rolling shutter, which forms the concealing device 3, comprises an apron comprising horizontal slats articulated on one another, forming the screen 2 of the rolling shutter 3, and guided by two lateral guideways 6. These slats are joined when the apron 2 of the rolling shutter 3 reaches its unwound lower position.

In the case of a rolling shutter, the wound upper position corresponds to the bearing of a final end slat 8, for example L-shaped, of the apron 2 of the rolling shutter 3 against an edge of a box 9 of the rolling shutter 3, and the unwound lower position corresponds to the bearing of the final end slat 8 of the apron 2 of the rolling shutter 3 against a threshold 7 of the opening 1.

The first slat of the apron 2 of the rolling shutter 3, opposite the final end slat 8, is connected to the winding tube 4 using at least one articulation 10, in particular a fastener in strip form.

The winding tube 4 is positioned inside the box 9 of the rolling shutter 3. The apron 2 of the rolling shutter 3 winds and unwinds around the rolling tube 4 and is housed at least partially inside the box 9.

In general, the box 9 is positioned above the opening 1, or in the upper part of the opening 1.

The motorized drive device 5 is controlled by a control unit. The control unit may for example be a local control unit 41, where the local control unit 41 can be connected through a wired or wireless connection with a central control unit 42. The central control unit 42 can drive the local control unit 41, as well as other similar local control units distributed throughout the building.

The central control unit 42 can be in communication with a weather station located outside the building, in particular including one or more sensors that can be configured for example to determine the temperature, brightness or wind speed.

A remote control 43, which can be a type of local control unit, provided with a control keypad and which comprises selection and display means, further allows a user to intervene on the electromechanical actuator 11, the local control unit 41 and/or the central control unit 42.

The motorized drive device 5 is preferably configured to carry out the unwinding or winding commands of the screen 2 of the concealing device 3, which may, in particular, be acquired by the remote control 43.

Figure 3:
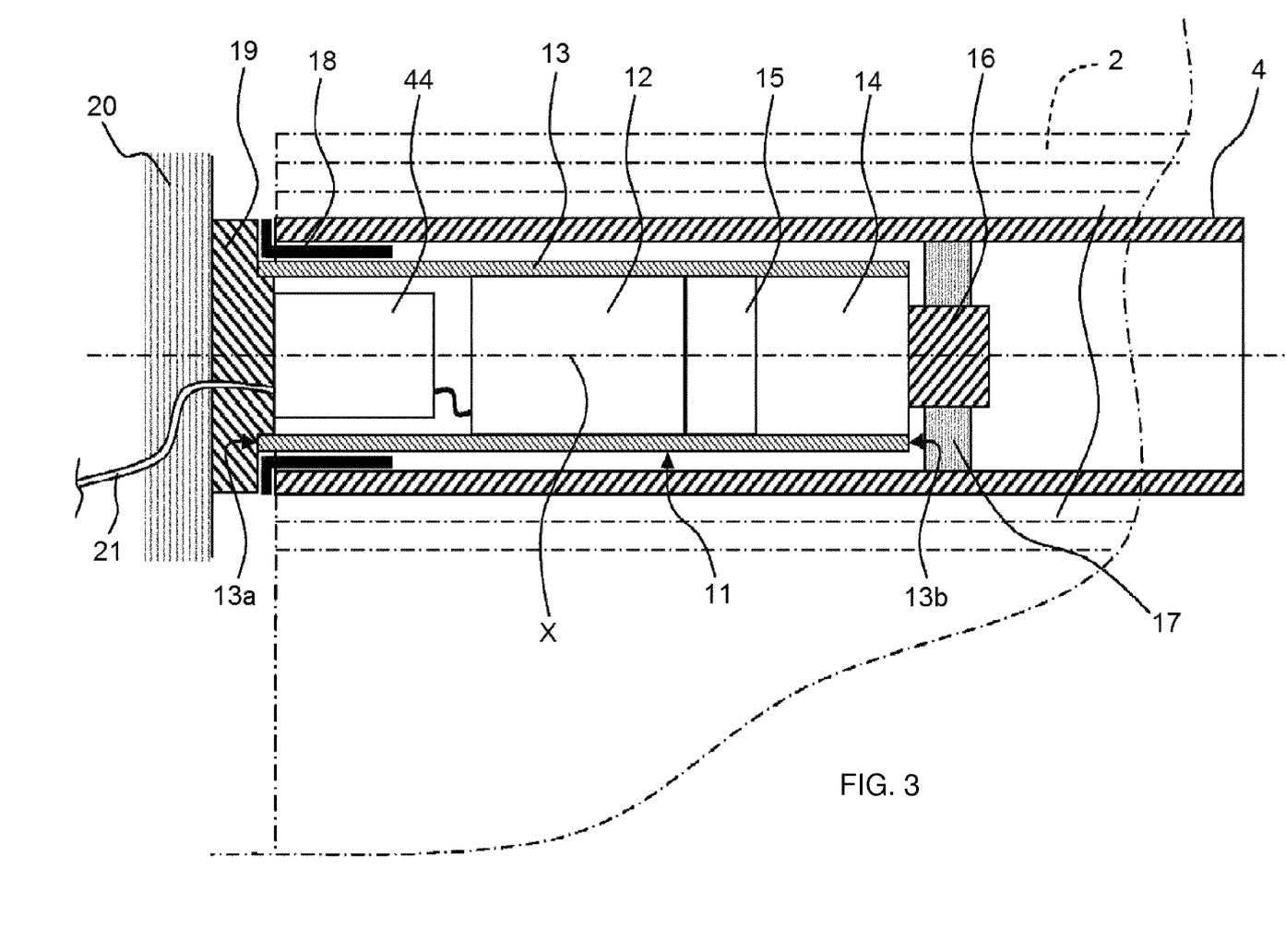
FIG. 3 is a schematic partial sectional view of the home automation installation illustrated in FIG. 2, at an electromechanical actuator.

The electromechanical actuator 11 belonging to the home automation installation of FIGS. 1 and 2 is now described in reference to FIG. 3.

The electromechanical actuator 11 comprises an electric motor 12. The electric motor 12 comprises a rotor and a stator, not shown, positioned coaxially around a rotation axis X, which is also the rotation axis of the winding tube 4 in the assembled configuration of the motorized drive device 5.

Control means for controlling the electromechanical actuator 11, making it possible to move the screen 2 of the concealing device 3, comprise at least one electronic control unit 44. This electronic control unit 44 is able to operate the electric motor 12 of the electromechanical actuator 11 and, in particular, to allow the supply of electricity for the electric motor 12.

Thus, the electronic control unit 44, in particular, controls the electric motor 12, so as to open or close the screen 2, as previously described.

The electronic control unit 44 also comprises an order receiving module, in particular for radioelectric orders sent by an order transmitter such as the remote control 43 designed to control the electromechanical actuator 11 or one of the local 41 or central 42 control units.

The order receiving module can also allow the reception of orders sent by wired means.

Here, and as illustrated in FIG. 3, the electronic control unit 44 is positioned inside a casing 13 of the electromechanical actuator 11.

The control means of the electromechanical actuator 11 comprise hardware and/or software means.

As one non-limiting example, the hardware means may comprise at least one microcontroller.

The electromechanical actuator 11 is supplied with electricity by an electricity grid of the sector, or using a battery, which can, for example, be recharged by a photovoltaic panel. The electromechanical actuator 11 makes it possible to move the screen 2 of the concealing device 3.

Here, the electromechanical actuator 11 comprises a power cable 21 allowing it to be supplied with electricity from an electricity grid of the sector.

The casing 13 of the electromechanical actuator 11 is preferably cylindrical.

In one embodiment, the casing 13 is made from a metal material.

The material of the casing of the electromechanical actuator is in no way limiting and may be different. It can be, in particular, a plastic.

The winding tube 4 is rotated around the rotation axis X and the casing 13 of the electromechanical actuator 11 supported by two pivot links. The first pivot link is produced at a first end of the winding tube 4 using a crown 18 inserted around and at one end 13a of the casing 13 of the electromechanical actuator 11. The crown 18 thus makes it possible to produce a bearing. The second pivot link, not shown in FIG. 3, is produced at a second end of the winding tube 4.

The electromechanical actuator 11 comprises a torque support 19. The torque support 19 protrudes at one end 13a of the casing 13 of the electromechanical actuator 11, in particular the end 13a of the casing 13 receiving the crown 18. The torque support 19 of the electromechanical actuator 11 thus makes it possible to fasten the electromechanical actuator 11 on a housing 20, in particular a flange of the box 9.

Furthermore, the torque support 19 of the electromechanical actuator 11 can make it possible to close off the end 13a of the casing 13.

Furthermore, the torque support 19 of the electromechanical actuator 11 can make it possible to support the electronic control unit 44. The electronic control unit 44 can be supplied with electricity via the power cable 21 electrically connected to the electricity grid of the sector, or a battery.

The electromechanical actuator 11 comprises a reduction gear 14. The reduction gear 14 comprises at least one reduction stage. Said at least one reduction stage can be a gear train of the epicyclic type.

The type and number of reduction stages of the reduction gear are in no way limiting.

The electromechanical actuator 11 comprises an output shaft 16. One end of the output shaft 16 protrudes relative to the casing 13 of the electromechanical actuator 11, in particular relative to an end 13b of the casing 13 opposite its end 13a.

The output shaft 16 of the electromechanical actuator 11 rotates a connecting element 17 connected to the winding tube 4. The connecting element 17 is made in the form of a wheel.

When the electromechanical actuator 11 is operated, the electric motor 12 and the reduction gear 14 rotate the output shaft 16. Furthermore, the output shaft 16 of the electromechanical actuator 11 rotates the winding tube 4 via the connecting element 17. Thus, the winding tube 4 rotates the screen 2 of the concealing device 3 so as to open or close the opening 1.

The electromechanical actuator 11 comprises a spring brake 15.

The electric motor 12, the reduction gear 14 and the spring brake 15 are mounted inside the casing 13 of the electromechanical actuator 11.

In the embodiment illustrated in FIG. 3, the spring brake 15 is positioned between the electric motor 12 and the reduction gear 14, i.e., at the output of the electric motor 12.

In another embodiment, not shown, where the reduction gear 14 comprises a plurality of reduction stages, the spring brake 15 is positioned between two reduction stages of the reduction gear 14.

In another embodiment, not shown, the spring brake 15 is positioned at the output of the reduction gear 14.

The electromechanical actuator 11 may also comprise an end-of-travel and/or obstacle detection device, this detection device being able to be mechanical or electronic.

The spring brake 15 of the electromechanical actuator 11, illustrated in FIG. 3 and according to one embodiment of the invention, is now described in reference to FIGS. 4 to 7.

The spring brake 15 comprises at least one helical spring 22, a drum 23, an input member 24 and an output member 25.

The drum 23 is kept in position in the casing 13 of the electromechanical actuator 11, in particular using ribs 28 arranged on the outer periphery of the drum 23 and configured to cooperate with tongues (not shown) of a housing of the reduction gear 14.

The housing of the reduction gear 14 is also kept in position in the casing 13 of the electromechanical actuator 11.

The drum 23 comprises a housing 26. Here, the housing 26 of the drum 23 is cylindrical. Furthermore, the housing 26 of the drum 23 is a through housing.

The helical spring 22, the input member 24 and the output member 25 are positioned inside the housing 26 of the drum 23, in the assembled configuration of the spring brake 15. The output member 25 is positioned across from the input member 24.

Here, the helical spring 22 comprises a plurality of turns. The turns of the helical spring 22 are centered on an axis combined with the rotation axis X, when the spring brake 15 is assembled, then mounted in the electromechanical actuator 11. Likewise, the input member 24 and the output member 25 are centered on an axis combined with the axis of rotation X, when the spring brake 15 is assembled, then mounted in the electromechanical actuator 11.

An inner friction surface 27 of the housing 26 of the drum 23 is configured to cooperate with at least one turn of the helical spring 22. In this way, at least one turn of the helical spring 22 is radially stressed by the housing 26 of the drum 23.

Here, the helical spring 22 is mounted tightly inside the housing 26 of the drum 23, so as to secure the helical spring 22 and the drum 23 by friction when the helical spring 22 is idle.

Each end of the helical spring 22 forms a tab 29 extending radially or axially relative to the rotation axis X of the spring brake 15.

Figure 4:
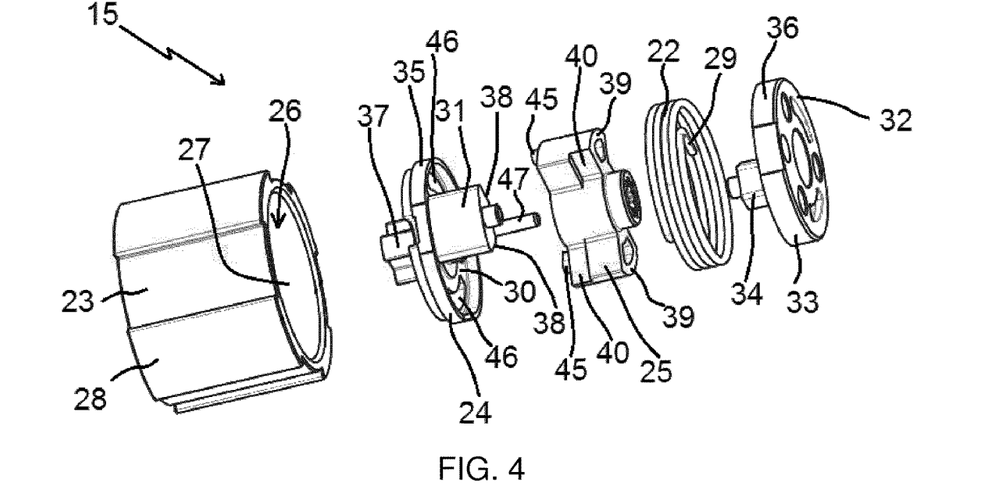
FIG. 4 is an exploded schematic perspective view of a spring brake of the electromechanical actuator illustrated in FIG. 3.

Here, the helical spring 22 comprises two tabs 29, only one of which is visible in FIG. 4.

In the exemplary embodiment illustrated in FIG. 4, the tabs 29 of the helical spring 22 extend radially relative to the rotation axis X of the spring brake 15 and toward the inside of the helical spring 22, in particular from the turns of the helical spring 22 toward the central axis of the helical spring 22.

The input member 24 is rotated by the electric motor 12.

Here, and as illustrated in FIGS. 4 to 7, the input member 24 comprises a shaft 37. The shaft 37 of the input member 24 makes it possible to receive and transmit a torque coming from the electric motor 12.

Figure 5:
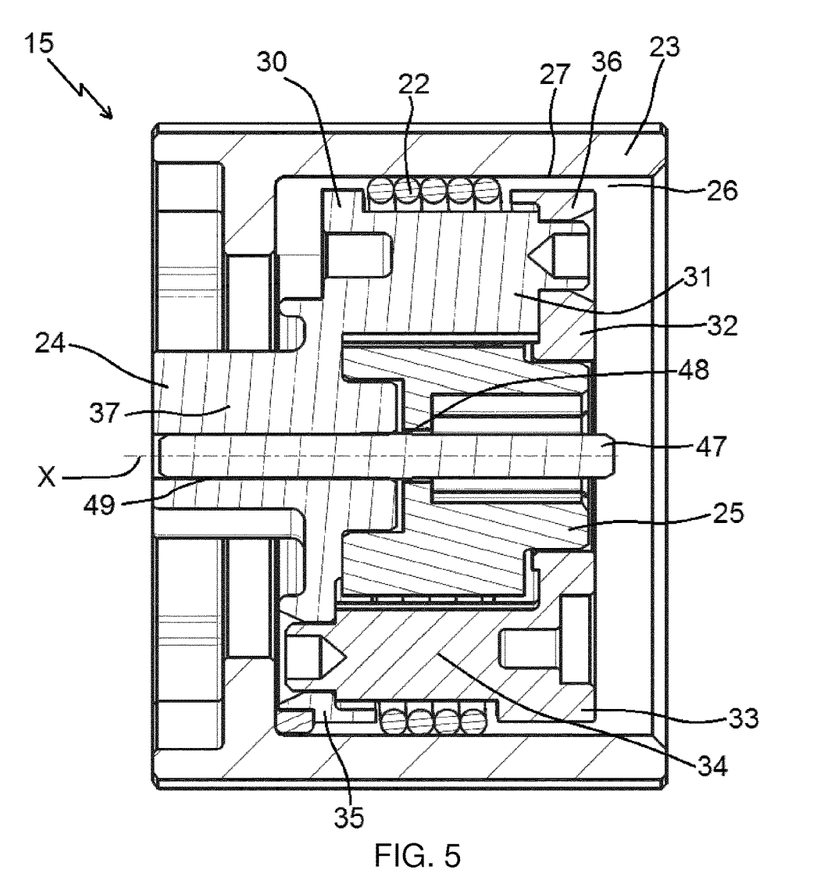
FIG. 5 is a schematic sectional view of the spring brake illustrated in FIG. 4.
Figure 6:
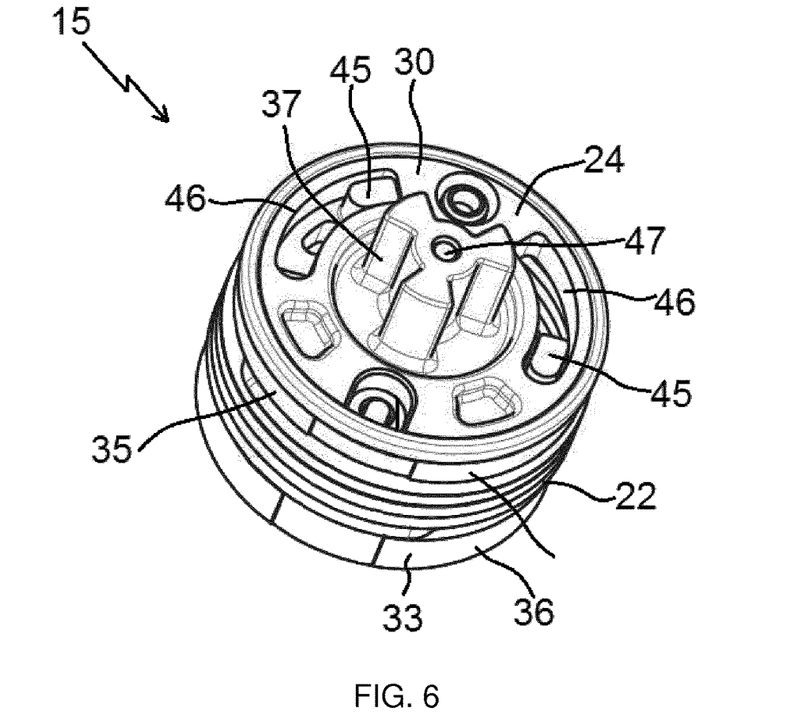
FIG. 6 is a schematic perspective view of the spring brake illustrated in FIGS. 4 and 5, where a drum of the spring brake has been removed.

In the exemplary embodiment illustrated in FIGS. 4 and 5, the input member 24 comprises a driving tooth 31. The driving tooth 31 of the input member 24 is inserted inside the helical spring 22, when the spring brake 15 is assembled.

The input member 24 also comprises a first plate 30.

Here, the first plate 30 comprises the driving tooth 31.

The driving tooth 31 of the input member 24 is positioned between the two tabs 29 of the helical spring 22 and cooperates with one or the other of the tabs 29 of the helical spring 22, depending on the direction of rotation generated by the electric motor 12.

The driving tooth 31 of the input member 24 comprises two driving faces 38. Each driving face 38 of the driving tooth 31 is configured to cooperate with a tab 29 of the helical spring 22.

Here, and as illustrated in FIGS. 4 and 5, the helical spring 22 and the output member 25 are kept axially in position between the first plate 30 of the input member 24 and a second plate 32 of a cover 33.

Here, and as illustrated in FIG. 4, the second plate 32 of the cover 33 comprises a spacer 34, positioned diametrically opposite the driving tooth 31 of the first plate 30 relative to the rotation axis X, when the spring brake 15 is assembled. The spacer 34 of the second plate 32 of the cover 33 thus makes it possible to maintain an axial separation between the first and second plates 30, 32.

In another embodiment, not shown, the first plate 30 of the input member 24 may comprise the spacer 34.

Here and as illustrated in FIGS. 4 and 5, the first and second plates 30, 32 each comprise a peripheral collar 35, 36. The two peripheral collars 35, 36 are positioned across from one another along the rotation axis X of the spring brake 15.

The first and second plates 30, 32 are secured in rotation around the rotation axis X of the spring brake 15.

In one embodiment, the first and second plates 30, 32 can be kept secured in rotation around the rotation axis X of the spring brake 15 by simple fitting.

In another embodiment, the first and second plates 30, 32 can be kept secured in rotation around the rotation axis X of the spring brake 15 by fastening using a fastening element, such as a fastening screw.

The output member 25 is connected to the screen 2 of the concealing device 3.

In the exemplary embodiment illustrated in FIGS. 4 and 5, the output member 25 comprises two lugs 39. The lugs 39 of the output member 25 are inserted inside the helical spring 22, when the spring brake 15 is assembled.

The lugs 39 of the output member 25 respectively comprise a recess 40. The recess 40 of each of the lugs 39 of the output member 25 is configured to cooperate with one of the tabs 29 of the helical spring 22.

The lugs 39 of the output member 25 further respectively comprise a protruding element 45. The protruding element 45 of each of the lugs 39 of the output member 25 extends parallel to the rotation axis X of the spring brake 15 and, in particular, toward the input member 24, when the spring brake 15 is assembled. The protruding element 45 of each of the lugs 39 of the output member 25 is configured to cooperate with an aperture 46 of the input member 24, when the spring brake 15 is assembled.

In one embodiment, the peripheral face of the protruding element 45 of one of the lugs 39 of the output member 25 can be put in contact with the contour of the corresponding aperture 46 of the input member 24, when one of the driving faces 38 of the driving tooth 31 of the input member 24 is in contact with the face of the corresponding lug 39 of the output member 25.

Here, and as illustrated in FIGS. 4 and 5, the output member 25 is centered relative to the input member 24 using an axle 47. The axle 47 is inserted, on the one hand, into a bore 48 of the output member 25 and, on the other hand, into a bore 49 of the input member 24.

The input member 24, in particular the driving tooth 31, is configured to cooperate with at least one of the tabs 29 of the helical spring 22 so as to rotate the helical spring 22 around the rotation axis X of the spring brake 15 in a first direction of rotation.

Such a movement releases the spring brake 15.

The friction force between at least one turn of the helical spring 22 and the inner surface 27 of the housing 26 of the drum 23 is decreased during the rotational driving of the helical spring 22 in the first direction of rotation.

In other words, this movement tends to decrease the diameter of the outer enclosure of the helical spring 22 and therefore to decrease the radial stress between the helical spring 22 and the inner surface 27 of the housing 26 of the drum 23.

Thus, the movement generated by the electric motor 12 can be transmitted from the input member 24 to the output member 25.

The outer enclosure of the helical spring 22 is defined by the outer generatrixes of the turns of the helical spring 22.

The output member 25, in particular one of the lugs 39, is configured to cooperate with at least one of the tabs 29 of the helical spring 22, so as to rotate the helical spring 22 around the rotation axis X of the spring brake 15 in a second direction of rotation.

Such a movement activates the spring brake 15, i.e., tends to block or slow the rotation of the helical spring 22 inside the housing 26 of the rotating drum 23.

The friction force between at least one turn of the helical spring 22 and the inner surface 27 of the housing 26 of the drum 23 is increased during the rotational driving of the helical spring 22 in the second direction of rotation.

In other words, this movement tends to increase the diameter of the outer enclosure of the helical spring 22, in particular by bringing the tabs 29 of the helical spring 22 closer together, and therefore to increase the radial stress between the helical spring 22 and the inner surface 27 of the housing 26 of the drum 23.

Advantageously, the spring brake 15 comprises a first lubricant, not shown, arranged between the helical spring 22 and the inner surface 27 of the housing 26 of the drum 23. The first lubricant is preferably grease.

Here, in the assembled configuration of the spring brake 15 of the electromechanical actuator 11, the friction of at least one turn of the helical spring 22 against the inner surface 27 of the housing 26 of the drum 23 is a so-called "charged" application.

The so-called "charged" application, in particular, means that the contact pressure generated by the helical spring 22 against the inner surface 27 of the housing 26 of the drum 23 is high.

As a non-limiting example, the contact pressure generated by the helical spring 22 against the inner surface 27 of the housing 26 of the drum 23 can be greater than 1 GPa.

The value of the contact pressure generated by the helical spring 22 against the inner surface 27 of the housing 26 of the drum 23 is due, in particular, to the shape of the section of a wire forming the helical spring 22.

In the case where the section of the wire forming the helical spring 22 is round, the contact surface between each turn of the helical spring 22 and the inner surface 27 of the housing 26 of the drum 23 is a line. As a result, the contact surface between each turn of the helical spring 22 and the inner surface 27 of the housing 26 of the drum 23 is small in order to transmit a force between the helical spring 22 and the drum 23.

Furthermore, the so-called "charged" application potentially means that the linear friction speed between at least one turn of the helical spring 22 and the inner surface 27 of the housing 26 of the drum 23 is high.

As a non-limiting example, the linear friction speed between the helical spring 22 and the inner surface 27 of the housing 26 of the drum 23 can be about 0.6 m/s.

We now describe a method for manufacturing the drum 23 of the spring brake 15, illustrated in FIGS. 4 to 7, according to one embodiment of the invention.

Figure 7:
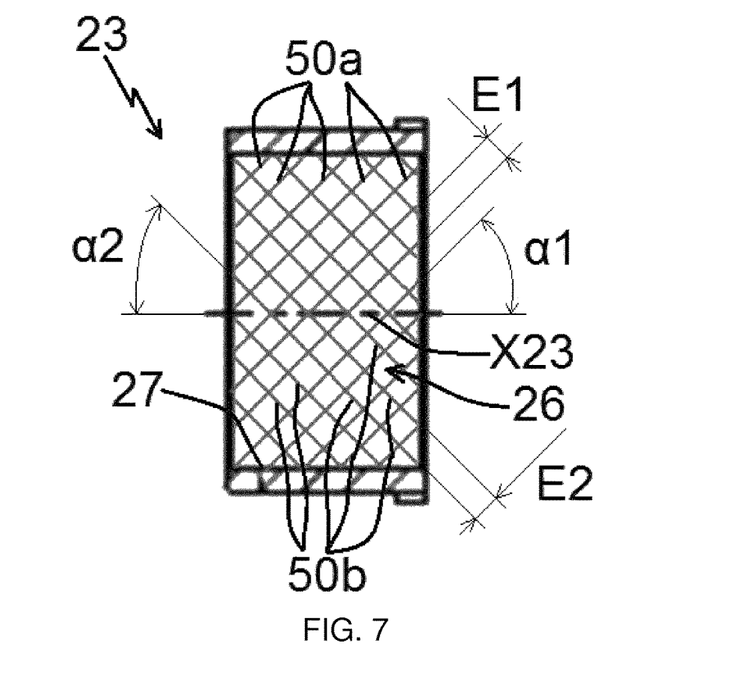
FIG. 7 is a schematic sectional view of the drum of the spring brake illustrated in FIGS. 4 to 6.

The method for manufacturing the drum 23 comprises a step for mechanical surface treatment of the inner surface 27 of the housing 26 of the drum 23. The mechanical surface treatment step of the inner surface 27 of the housing 26 of the drum 23 is a step for generating furrows 50a, 50b on the inner surface 27 of the housing 26, as illustrated in FIG. 7. For the clarity of the drawing, these furrows are not shown in FIGS. 4 and 5.

Thus, the inner surface 27 of the housing 26 of the drum 23 includes furrows 50a, 50b obtained by a mechanical surface treatment, so as to improve the guiding of the first lubricant, optimize the lubrication of the contact zones between the helical spring 22 and the drum 23 and reduce the operating noise of the spring brake 15.

In this way, the inner surface 27 of the housing 26 of the drum 23 has a specific texturing of the surface with which at least one turn of the helical spring 22 is in contact.

Furthermore, the mechanical surface treatment of the inner surface 27 of the housing 26 of the drum 23 allows a precise determination of the roughness parameters of the inner surface 27 of the housing 26 of the drum 23, so as to guarantee the maintenance of the first lubricant between the helical spring 22 and the inner surface 27 of the housing 26 of the drum 23.

The roughness parameters of the inner surface 27 of the housing 26 of the drum 23 are, in particular, the parameters called Rz, Rk, Rpk and Rvk. The parameter Rz corresponds to the maximum height of a roughness profile of the inner surface 27 of the housing 26 of the drum 23, i.e., separated from the highest peak and the deepest valley. The parameter Rk corresponds to the depth of the clipped roughness profile, i.e., a lower limit and an upper limit of the average roughness. The parameter Rpk corresponds to the average height of the peaks rising above the clipped roughness profile. The parameter Rvk corresponds to the average depth of the valleys located below the clipped roughness profile.

A peak of the roughness profile can also be called a protrusion. A valley of the roughness profile can also be called a hollow.

Here, the mechanical surface treatment of the inner surface 27 of the housing 26 of the drum 23 is implemented so as to obtain deep valleys, i.e., a high value of the parameter Rvk, and peaks with a low height, i.e., a small value of the parameter Rpk, so as to guarantee the greatest carrying of the helical spring 22 by the housing 26 of the drum 23.

In practice, the roughness parameters of the inner surface 27 of the housing 26 of the drum 23 depend on characteristics of the first lubricant arranged between the helical spring 22 and the inner surface 27 of the housing 26 of the drum 23.

As a non-limiting example, the furrows 50a, 50b formed at the inner surface 27 of the housing 26 of the drum 23 have the following threshold values: Rz below 6 micrometers, Rk between 0.3 micrometers and 1.5 micrometers, Rpk below 0.6 micrometers and Rvk above 0.5 micrometers, or even around 2 micrometers.

Advantageously, the mechanical surface treatment of the inner surface 27 of the housing 26 of the drum 23 corresponds to a mechanical surface treatment called "crosshatch honing". The crosshatch honing technique consists of generating texturing of a surface, in the present case of the inner surface 27 of the housing 26 of the drum 23.

The mechanical surface treatment of the inner surface 27 of the housing 26 of the drum 23 using the crosshatch honing technique makes it possible to obtain a controlled surface state including deep valleys and peaks having a limited height.

Thus, during the friction of at least one turn of the helical spring 22 on the inner surface 27 of the housing 26 of the drum 23, the limitation of the peaks makes it possible to guarantee a movement of the helical spring 22 relative to the drum 23 while avoiding jumps.

Furthermore, when at least one turn of the helical spring 22 rubs on the inner surface 27 of the housing 26 of the drum 23, the depth of the valleys makes it possible to keep a reserve of the first lubricant between the helical spring 22 and the inner surface 27 of the housing 26 of the drum 23, even though the contact pressure generated by the helical spring 22 against the inner surface 27 of the housing 26 of the drum 23 is high.

Preferably, each furrow 50a, 50b arranged at the inner surface 27 of the housing 26 of the drum 23 is oriented by a predetermined angle $\alpha 1$, $\alpha 2$ relative to a rotation axis X23 of the drum 23. This rotation axis X23 is combined with the rotation axis X, in the assembled configuration of the spring brake 15.

Advantageously, the orientation angle $\alpha 1$, $\alpha 2$ of the furrows 50a, 50b arranged at the surface 27 of the housing 26 of the drum 23 is determined as a function of the roughness parameters of the inner surface 27 of the housing 26 of the drum 23.

In practice, the orientation angle $\alpha 1$, $\alpha 2$ of the furrows 50a, 50b depends on characteristics of the first lubricant arranged between the helical spring 22 and the inner surface 27 of the housing 26 of the drum 23.

Advantageously, the orientation angle $\alpha 1$, $\alpha 2$ of the furrows 50a, 50b arranged at the inner surface 27 of the housing 26 of the drum 23 is determined relative to the friction direction of at least one turn of the helical spring 22 relative to the inner surface 27 of the housing 26 of the drum 23.

In one preferred exemplary embodiment illustrated in FIG. 7, the mechanical surface treatment step of the inner surface 27 of the housing 26 consists of generating a first series of furrows 50a and a second series of furrows 50b on the inner surface 27 of the housing 26. The furrows 50a of the first series are crossed relative to the furrows 50b of the second series. The furrows 50a of the first series are oriented by a first predetermined angle $\alpha 1$ relative to the rotation axis X23 of the drum 23. Furthermore, the furrows 50b of the second series are oriented by a second predetermined angle $\alpha 2$ relative to the rotation axis X23 of the drum 23.

Thus, the orientation of the furrows 50a of the first series relative to the rotation axis X23 of the drum 23 makes it possible to guide the first lubricant at the contact zones between the helical spring 22 and the inner surface 27 of the housing 26 of the drum 23, in the first rotation direction of the helical spring 22 relative to the drum 23 around the rotation axis X.

Furthermore, the orientation of the furrows 50b of the second series relative to the rotation axis X23 of the drum 23 makes it possible to guide the first lubricant at the contact zones between the helical spring 22 and the inner surface 27 of the housing 26 of the drum 23, in the second rotation direction of the helical spring 22 relative to the drum 23 around the rotation axis X.

The first rotation direction of the helical spring 22 relative to the drum 23 is opposite the second rotation direction of the helical spring 22 relative to the drum 23.

In this way, the furrows 50a of the first series and the furrows 50b of the second series allow an operation of the spring brake 15 in the first and second rotation directions of the helical spring 22 relative to the drum 23.

Furthermore, the crossing of the furrows 50a of the first series with the furrows 50b of the second series makes it possible to guide the first lubricant all the way around the helical spring 22, during the friction of at least one turn of the helical spring 22 on the inner surface 27 of the housing 26 of the drum 23.

In this way, when the helical spring 22 is rotated inside the drum 23, all of the furrows 50a, 50b participate in the lubrication of the contact zones between the helical spring 22 and the drum 23, since the furrows 50a, 50b spread the first lubricant over the entire inner surface 27 of the housing 26 of the drum 23, rather than moving it in a single given direction.

Advantageously, the mechanical surface treatment of the inner surface 27 generating furrows 50a, 50b is done using an abrasion element, in particular an abrasive stone.

In practice, the first orientation angle $\alpha 1$ of the furrows 50a of the first series is opposite the second orientation angle $\alpha 2$ of the furrows 50b of the second series.

In the exemplary embodiment illustrated in FIG. 7, the value of the first orientation angle $\alpha 1$ of the furrows 50a of the first series is equal to the value of the second orientation angle $\alpha 2$ of the furrows 50b of the second series.

In a variant, not shown, the value of the first orientation angle $\alpha 1$ of the furrows 50a of the first series is different from the value of the second orientation angle $\alpha 2$ of the furrows 50b of the second series.

Advantageously, the first orientation angle $\alpha 1$ and the second orientation angle $\alpha 2$, respectively, of the furrows 50a of the first series and the furrows 50b of the second series, relative to the rotation axis X23 of the drum 23, are comprised in a range extending between 45° and 85° and preferably of about 80°.

Advantageously, the furrows 50a of the first series are parallel relative to one another. Furthermore, the furrows 50b of the second series are parallel to one another.

Advantageously, the furrows 50a of the first series are spaced apart relative to one another by a predetermined separation E1.

Here, the predetermined separation E1 between two adjacent furrows 50a of the first series is constant for each pair of furrows 50a of the first series.

Furthermore, the furrows 50b of the second series are spaced apart relative to one another by a predetermined separation E2.

Here, the predetermined separation E2 between two adjacent furrows 50b of the second series is constant for each pair of furrows 50b of the second series.

In the exemplary embodiment illustrated in FIG. 7, the predetermined separation E1 between two adjacent furrows 50a of the first series is identical to the predetermined separation E2 between two adjacent furrows 50b of the second series.

In a variant, not shown, the predetermined separation E1 between two adjacent furrows 50a of the first series is different from the predetermined separation E2 between two adjacent furrows 50b of the second series.

In practice, before the mechanical surface treatment step, the method for manufacturing the drum 23 comprises a step for obtaining the drum 23.

Advantageously, the step for obtaining the drum 23 comprises a sub-step for molding the drum 23 and, optionally, a sub-step for machining the drum 23 and, in particular, the inner surface 27 of the housing 26 of the drum 23.

Advantageously, following the mechanical surface treatment step, the method comprises a thermochemical surface treatment step of the drum 23.

Thus, the thermochemical surface treatment of the drum 23 makes it possible to increase the hardness of the surface of the drum 23.

In this way, the hardening of the surface of the drum 23 and, in particular, of the inner surface 27 of the housing 26 of the drum 23, makes it possible to limit the deformation and the wear of the inner surface 27, during the friction of at least one turn of the helical spring 22 on this inner surface 27.

As a result, the hardening of the inner surface 27 of the housing 26 of the drum 23 makes it possible to limit the abrasion of the drum 23 and therefore to limit the presence of residues coming from the drum 23 trapped in the first lubricant arranged between the helical spring 22 and the inner surface 27, such residues being able to create premature wear of the helical spring 22 and of the drum 23.

The thermochemical surface treatment of the drum 23 makes it possible to guarantee a hardness level and an abrasion resistance level of the inner surface 27 of the housing 26 of the drum 23, so as to avoid the formation of furrows created by the friction of at least one turn of the helical spring 22 on the inner surface 27 of the housing 26 of the drum 23.

In this way, the thermochemical surface treatment of the drum 23 makes it possible to guarantee better friction stability of at least one turn of the helical spring 22 on the inner surface 27 of the housing 26 of the drum 23, during the friction of at least one turn of the helical spring 22 on this inner surface 27.

Furthermore, the hardening of the inner surface 27 of the housing 26 of the drum 23 makes it possible to prevent the flattening of the furrows 50a, 50b arranged at the inner surface 27 of the housing 26 of the drum 23, as well as to avoid the polishing of the inner surface 27, such flattening and/or such polishing being able to create an unstable component of the spring brake 15 and the appearance of noise, during the operation of the spring brake 15.

Furthermore, the thermochemical surface treatment of the drum 23 makes it possible to contribute an additional lubricant layer at the surface of the drum 23 and, in particular, the inner surface 27 of the housing 26 of the drum 23. Such an additional layer of lubricant generated by the thermochemical surface treatment of the drum 23 contributes to improving operating conditions of the spring brake 15.

Advantageously, the thermochemical surface treatment of the drum 23 is a thermochemical surface treatment by diffusion, in particular of nonmetallic elements. Such a thermochemical surface treatment can, for example, correspond to a thermochemical surface treatment called "nitrocarburizing" or a thermochemical surface treatment called "nitriding".

Advantageously, following the thermochemical surface treatment step, the method comprises a step for applying a solid lubricant, not shown, also called second lubricant, on the inner surface 27 of the housing 26 of the drum 23.

Here, the solid lubricant is deposited on the inner surface 27 of the housing 26 of the drum 23.

Thus, during the friction of at least one turn of the helical spring 22 on this inner surface 27 of the housing 26 of the drum 23, the solid lubricant applied on this inner surface 27 is spent by abrasion.

In this way, the solid lubricant residues generated by the friction of the helical spring 22 on the inner surface 27 of the housing 26 of the drum 23 are introduced into the furrows 50a, 50b arranged at the inner surface 27 of the housing 26 of the drum 23.

As a result, these solid lubricant residues make it possible to continue to lubricate the contact zones between the helical spring 22 and the inner surface 27 of the housing 26 of the drum 23, during the rotational driving of the helical spring 22 inside the drum 26.

Furthermore, the solid lubricant residues, generated by the friction of at least one turn of the helical spring 22 on the inner surface 27 of the housing 26 of the drum 23, are arranged at the first lubricant, in grease form, positioned between the helical spring 22 and the inner surface 27 of the housing 26 of the drum 23. Such solid lubricant residues generated by the friction of the helical spring 22 on the inner surface 27 of the housing 26 of the drum 23 contribute to improving the operating conditions of the spring brake 15.

As a completely non-limiting example, the solid lubricant can be molybdenum disulfide or tungsten disulfide.

The application of the solid lubricant on the inner surface 27 of the housing 26 of the drum 23 has the advantage that such lubrication is independent of the environmental conditions to which the helical spring 22 and the drum 23 are exposed. The environmental conditions are, in particular, the temperature and the humidity.

Advantageously, the step for applying solid lubricant is carried out by spraying the second lubricant in powder form on the inner surface 27 of the housing 26 of the drum 23.

Advantageously, following the step for application of the solid lubricant, the method comprises a step for drying of the solid lubricant, so as to guarantee that the solid lubricant sets on the inner surface 27 of the housing 26 of the drum 23.

The step for drying of the solid lubricant can be carried out, for example, by a waiting phase or a phase for curing in an oven.

We now describe a method for manufacturing the helical spring 22 of the spring brake 15, illustrated in FIGS. 4 to 7, according to one embodiment of the invention.

The method for manufacturing the helical spring 22 comprises a step for obtaining the helical spring 22.

Advantageously, the step for obtaining the helical spring 22 comprises a sub-step for shaping a raw wire, from which the helical spring 22 is formed. The sub-step for shaping the raw wire is carried out by winding the raw wire into a plurality of turns.

After the shaping sub-step, the method comprises a sub-step for cutting the raw wire, so as to detach the turns forming the helical spring 22 relative to the raw wire.

After the cutting sub-step, the method comprises a sub-step for shaping a first tab 29 of the helical spring 22, at a first end of the cut wire forming the turns of the helical spring 22, and a sub-step for shaping a second tab 29 of the helical spring 22, at a second end of this cut wire. The first end of the cut wire forming the turns of the helical spring 22 is opposite the second end of the cut wire.

Advantageously, after the step for obtaining the helical spring 22, the method comprises a step for roller burnishing of the outer surface of the turns of the helical spring 22.

Thus, the roller burnishing of the outer surface of the turns of the helical spring 22 makes it possible to modify the section of the wire forming the helical spring 22 and, in particular, to flatten the outer surface of the helical spring 22.

In this way, the roller burnishing of the outer surface of the turns of the helical spring 22 makes it possible to decrease the contact pressure of at least one turn of the helical spring 22 on the inner surface 27 of the housing 26 of the drum 23, during the operation of the spring brake 15.

The decreased contact pressure of at least one turn of the helical spring 22 on the inner surface 27 of the housing 26 of the drum 23 is due to the increased surface of at least one turn of the helical spring 22 on the inner surface 27.

As a result, the roller burnishing of the outer surface of the turns of the helical spring 22 makes it possible to reduce the operating noise of the spring brake 15, since a decrease in the contact pressure of at least one turn of the helical spring 22 on the inner surface 27 of the housing 26 of the drum 23, during the operation of the spring brake 15, facilitates the lubrication of the contact zones between the helical spring 22 and the inner surface 27 of the housing 26 of the drum 23.

Preferably, after the roller burnishing step, the method comprises a thermochemical treatment step of the surface of the helical spring 22.

Advantageously, the thermochemical surface treatment of the surface of the helical spring 22 is a thermochemical surface treatment called "DLC" (acronym for Diamond Like Carbon).

The DLC technique consists of implementing a thin layer deposition of amorphous carbon, for example with a thickness of three micrometers.

Thus, the DLC technique makes it possible to increase the hardness level of the surface of the helical spring 22 and to improve the lubrication of the surface of the helical spring 22.

In this way, the high hardness level of the surface of the helical spring 22 makes it possible to withstand the shearing caused by the operation of the spring brake 15, limit the wear of the helical spring 22 and, as a result, avoid the generation of abrasive particles.

Furthermore, the thermochemical surface treatment of the helical spring 22 makes it possible to guarantee better friction stability of at least one turn of the helical spring 22 on the inner surface 27 of the housing 26 of the drum 23, during the friction of at least one turn of the helical spring 22 on the inner surface 27.

Furthermore, the hardening of the surface of the helical spring 22 makes it possible to avoid the polishing of the surface of the helical spring 22, this polishing being able to cause an unstable behavior of the spring brake 15 and the appearance of noise, during the operation of the spring brake 15.

Moreover, the DLC technique makes it possible to obtain a low friction coefficient of the surface of the helical spring 22, so as to favor a stable behavior of the spring brake 15 and to limit the appearance of noise, during the operation of the spring brake 15.

In a variant, after the roller burnishing step, the method comprises a mechanical surface treatment step of the surface of the helical spring 22.

Advantageously, the mechanical surface treatment of the surface of the helical spring 22 is a mechanical surface treatment called "tribofinishing".

The "tribofinishing" technique results in generating random deformations of the surface of the helical spring 22, so as to favor the lubrication of the helical spring 22 and the creation of reserves of first lubricant at the contact zones between the helical spring 22 and the inner surface 27 of the housing 26 of the drum 23.

Preferably, the mechanical surface treatment step of the surface of the helical spring 22, in particular called "tribofinishing", is implemented to replace the thermochemical treatment step of the surface of the helical spring 22, in particular called "DLC".

In a variant, after the roller burnishing step, the method comprises a chemical surface treatment step of the surface of the helical spring 22.

Advantageously, the chemical surface treatment of the helical spring 22 is a chemical deposition surface treatment. Such a chemical surface treatment can, for example, correspond to a chemical surface treatment called "NiP HP" (acronym for Nickel-Phosphorus High Phosphorus).

The NiP HP technique consists of implementing a deposition of a layer of Nickel and Phosphorus, for example with a thickness of twenty micrometers.

Thus, the NiP HP technique makes it possible to decrease the roughness of the surface of the helical spring 22 and, as a result, to hide the grooves related to the step for obtaining the helical spring 22.

Furthermore, the NiP HP technique makes it possible to increase the hardness level of the surface of the helical spring 22 and to improve the lubrication of the surface of the helical spring 22.

Preferably, the chemical surface treatment step of the surface of the helical spring 22, in particular called "NiP HP", is implemented to replace the thermochemical treatment step of the surface of the helical spring 22, in particular called "DLC".

We now describe a manufacturing method of the spring brake 15, illustrated in FIGS. 4 to 7, according to one embodiment of the invention.

The method for manufacturing the spring brake 15 comprises a step for assembling the helical spring 22, preferably obtained using the manufacturing method previously described, the input member 24 and the output member 25 inside the housing 26 of the drum 23, obtained using the manufacturing method previously described.

Owing to the present invention, the method comprises at least one mechanical surface treatment step for the inner surface of the housing of the drum, the mechanical surface treatment step for the inner surface of the housing of the drum being a step for generating furrows on the inner surface of the housing.

Thus, the inner surface of the housing of the drum includes furrows obtained by a mechanical surface treatment, so as to improve the guiding of a lubricant, optimize the lubrication of the contact zones between the helical spring and the drum and reduce the operating noise of the spring brake.

In this way, the inner surface of the housing of the drum has a specific texturing of the surface with which at least one turn of the helical spring is in contact.

Furthermore, the mechanical surface treatment of the inner surface of the housing of the drum allows a precise determination of the roughness parameters of the inner surface of the housing of the drum, so as to guarantee the maintenance of the lubricant between the helical spring and the inner surface of the housing of the drum.

As a result, the mechanical surface treatment of the inner surface of the housing of the drum makes it possible to guarantee the lubrication between the helical spring and the drum and to control the contact interface between at least one turn of the helical spring and the inner surface of the housing of the drum.

Many changes can be made to the example embodiment previously described without going beyond the scope of the invention defined by the claims.

Furthermore, the considered embodiments and alternatives may be combined to generate new embodiments of the invention, without going beyond the scope of the invention defined by the claims.

The invention claimed is:

1. A method for manufacturing a drum of a spring brake of an electromechanical actuator, the drum including a housing configured to house at least one helical spring, an input member, and an output member, the method comprising:
   at least one mechanical surface treatment step for treating the inner friction surface of the housing of the drum, the inner friction surface being configured to cooperate with the at least one turn of the helical spring, the mechanical surface treatment step for the inner friction surface of the housing of the drum being a step for generating furrows on the inner friction surface of the housing; and
   a thermochemical surface treatment step of the drum following the mechanical surface treatment step.

2. The method for manufacturing the drum of the spring brake of the electromechanical actuator according to claim 1, wherein each furrow arranged at the inner surface of the housing of the drum is oriented by a predetermined angle relative to a rotation axis of the drum.

3. A method for manufacturing a spring brake of an electromechanical actuator, the spring brake including:
   a helical spring,
   the drum obtained according to the manufacturing method according to claim 2, the drum including the housing, the inner friction surface of the housing of the drum being configured to cooperate with the at least one turn of the helical spring,
   the input member, and
   the output member,
the method comprising:
   at least one step for assembling the helical spring, the input member, and the output member to the inside of the housing of the drum.

4. The method for manufacturing the drum of the spring brake of the electromechanical actuator according to claim 2, wherein the step for mechanical surface treatment of the inner surface of the housing consists of generating a first series of furrows and a second series of furrows on the inner surface of the housing, in that the furrows of the first series are crossed relative to the furrows of the second series, wherein the furrows of the first series are oriented by a first predetermined angle relative to the rotation axis of the drum and wherein the furrows of the second series are oriented by a second predetermined angle relative to the rotation axis of the drum.

5. A method for manufacturing a spring brake of an electromechanical actuator, the spring brake including:
   a helical spring,
   the drum obtained according to the manufacturing method according to claim 4, the drum including the housing, the inner friction surface of the housing of the drum being configured to cooperate with the at least one turn of the helical spring,
   the input member, and
   the output member,
the method comprising:
   at least one step for assembling the helical spring, the input member, and the output member to the inside of the housing of the drum.

6. The method for manufacturing the drum of the spring brake of the electromechanical actuator according to claim 4, wherein the first orientation angle and the second orientation angle, respectively, of the furrows of the first series and the furrows of the second series, relative to the rotation axis of the drum, are comprised in a range extending between 45° and 85°.

7. A method for manufacturing a spring brake of an electromechanical actuator, the spring brake including:
   a helical spring,
   the drum obtained according to the manufacturing method according to claim 6, the drum including the housing, the inner friction surface of the housing of the drum being configured to cooperate with the at least one turn of the helical spring,
   the input member, and
   the output member,
the method comprising:
   at least one step for assembling the helical spring, the input member, and the output member to the inside of the housing of the drum.

8. The method for manufacturing the drum of the spring brake of the electromechanical actuator according to claim 1, wherein, following the thermochemical surface treatment step, the method comprises a step for applying a solid lubricant, on the inner surface of the housing of the drum.

9. The method for manufacturing the drum of the spring brake of the electromechanical actuator according to claim 8, wherein the step for applying solid lubricant is carried out by spraying lubricant in powder form on the inner surface of the housing of the drum.

10. A method for manufacturing a spring brake of an electromechanical actuator, the spring brake including:
   a helical spring,
   the drum obtained according to the manufacturing method according to claim 9, the drum including the housing, the inner friction surface of the housing of the drum being configured to cooperate with the at least one turn of the helical spring,
the input member, and
the output member, the method comprising:
at least one step for assembling the helical spring, the input member, and the output member to the inside of the housing of the drum.

11. A method for manufacturing a spring brake of an electromechanical actuator, the spring brake including:
a helical spring,
the drum obtained according to the manufacturing method according to claim 8, the drum including the housing, the inner friction surface of the housing of the drum being configured to cooperate with the at least one turn of the helical spring,
the input member, and
the output member, the method comprising:
at least one step for assembling the helical spring, the input member, and the output member to the inside of the housing of the drum.

12. A method for manufacturing a spring brake of an electromechanical actuator, the spring brake including:
a helical spring,
the drum obtained according to the manufacturing method according to claim 1, the drum including the housing, the inner friction surface of the housing of the drum being configured to cooperate with the at least one turn of the helical spring,
the input member, and
the output member, the method comprising:
at least one step for assembling the helical spring, the input member, and the output member to the inside of the housing of the drum.

13. An electromechanical actuator for a home automation installation for closing or providing sun protection, the electromechanical actuator comprising:
an electric motor;
a reduction gear;
the spring brake obtained according to the manufacturing method according to claim 12, the spring brake comprising:
the helical spring,
the drum,
the drum including the housing, the inner friction surface of the housing of the drum being configured to cooperate with the at least one turn of the helical spring,
the input member, and
the output member,
wherein the inner surface of the housing of the drum includes furrows.

14. A home automation installation for closing or providing sun protection, the home automation installation comprising:
the electromechanical actuator according to claim 13; and
a screen configured to be wound on a winding tube rotated by the electromechanical actuator.

* * * * *